United States Patent [19]
Hollick

[11] Patent Number: 5,935,343
[45] Date of Patent: Aug. 10, 1999

[54] COMBINED SOLAR COLLECTOR AND PHOTOVOLTAIC CELLS

[76] Inventor: John Carl Hollick, 15 Melissa Court, Maple, Ontario, Canada, L6A 1G2

[21] Appl. No.: 09/042,044

[22] Filed: Mar. 13, 1998

[51] Int. Cl.$^6$ .................................................. H01L 31/052
[52] U.S. Cl. ...................... 136/246; 136/244; 136/259; 126/621; 126/623; 126/632; 126/633; 126/670; 126/675; 126/622; 126/629; 52/173.3
[58] Field of Search ...................... 136/246, 244, 136/259; 126/621, 623, 632, 633, 670, 675, 622, 629; 52/173.3

[56] References Cited

U.S. PATENT DOCUMENTS

| | | | |
|---|---|---|---|
| 4,246,892 | 1/1981 | Waiche | 126/662 |
| 4,278,072 | 7/1981 | Ryan et al. | 126/632 |
| 4,392,483 | 7/1983 | Koenig | 124/650 |
| 4,473,066 | 9/1984 | Clark | 126/675 |
| 4,607,616 | 8/1986 | Lehmann | 126/669 |
| 4,774,932 | 10/1988 | Hollick | 126/632 |
| 4,899,728 | 2/1990 | Peter et al. | 126/622 |

*Primary Examiner*—Alan Diamond
*Attorney, Agent, or Firm*—Shoemaker and Mattare, Ltd.

[57] ABSTRACT

There is provided the combination of a corrugated solar collector panel and a building surface to which it is attached, in spaced relationship. At least some of the panel corrugations are flat and located such that they face in the general direction of the sun during at least a portion of the daylight hours. Generally uniformly distributed apertures are provided in the panel, and specifically at flat areas in the corrugations. The combination further includes photovoltaic cells mounted to the corrugations at flat portions thereof containing the apertures, with the cells being supported substantially parallel with and adjacent to but spaced apart from the flat surfaces, thus leaving air passages between the photovoltaic cells and the solar collector, whereby air can enter and leave the enclosed space by flowing through the air passages and along the undersides of the photovoltaic cells, thus removing excess heat build-up from the voltaic cells. In a variant, the photovoltaic cells are incorporated into individual panels adapted to span several corrugations.

12 Claims, 4 Drawing Sheets

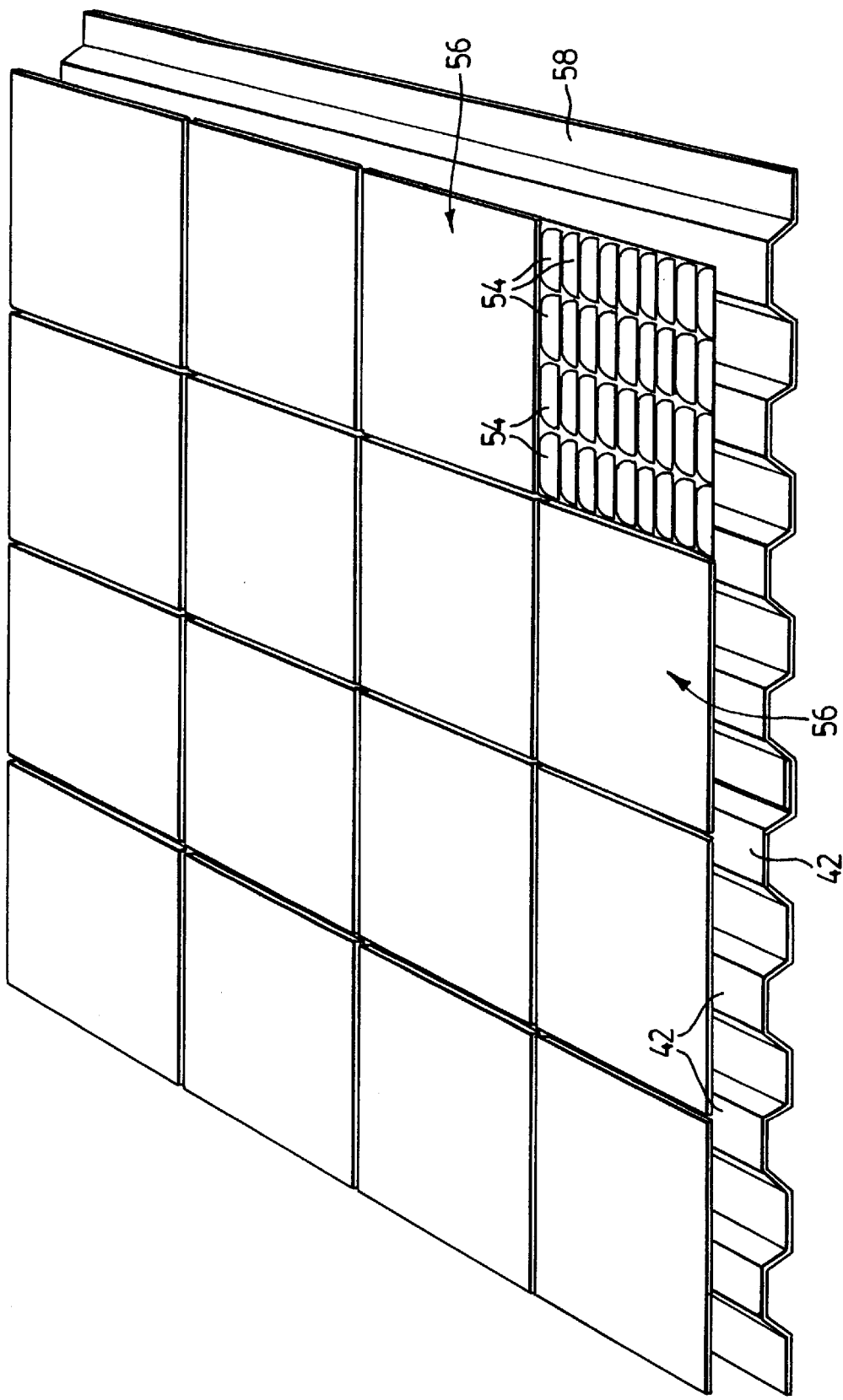

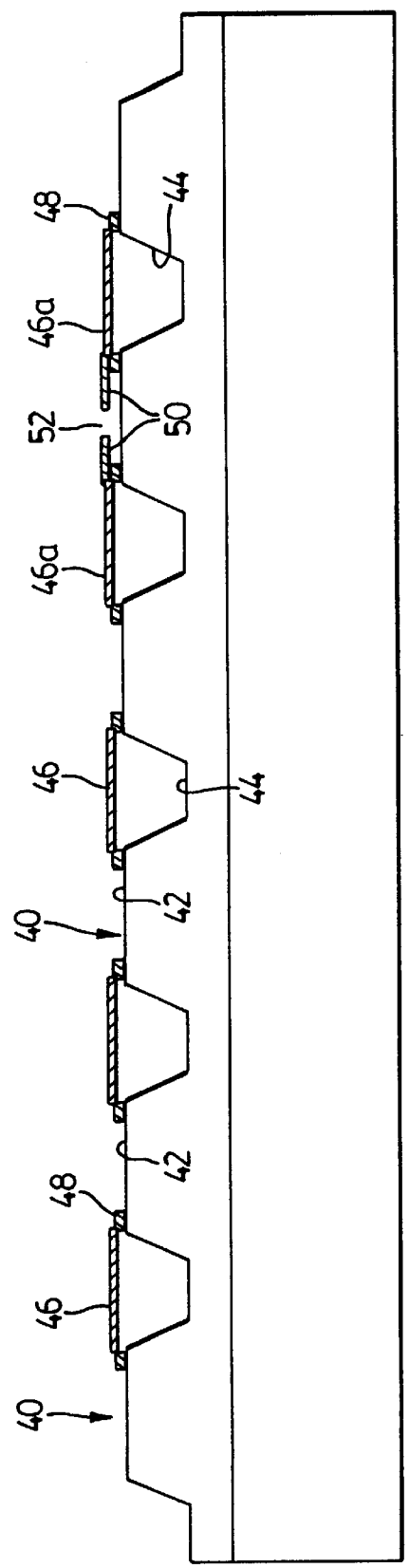

COMBINED SOLAR COLLECTOR AND PHOTOVOLTAIC CELLS

This invention relates generally to the combination of a solar collector and photovoltaic cells, and has to do particularly with an arrangement by which overheating of the photovoltaic cells is avoided.

BACKGROUND OF THIS INVENTION

Photovoltaic panels are generally only 5% to 15% efficient in converting sunlight into electrical energy. Much of the remaining energy is lost as thermoenergy.

It is already known to combine photovoltaic cells with solar collectors, in order that the sun's energy can be tapped for both heat and electrical energy. The photovoltaic cells are typically secured directly against appropriately sized flat portions of the corrugations, and are held in place by conventional fastening means. In the event of a particularly hot run of weather, with ambient temperatures of 30° C. or even greater, the heat energy collected by the solar collector panel can result in damage to the photovoltaic cells, eventually requiring that such cells be replaced.

The present invention addresses this problem of overheating photovoltaic cells associated with a solar collector panel.

GENERAL DESCRIPTION OF THIS INVENTION

More specifically, this invention provides, in combination, a generally corrugated solar collector panel adapted to be secured to a building surface in spaced relation thereto, to define therewith an enclosed space, a substantially flat surface defined by each of at least some of the panel corrugations, each substantially flat surface being configured and located such that it faces in the general direction of the sun during at least a portion of the daylight hours, at least part of the panel having a plurality of generally uniformly distributed apertures, said at least part of the panel including at least a portion of said flat surfaces of the corrugations, a plurality of substantially flat photovoltaic cells, and mounting means securing the photovoltaic cells to the corrugations at said flat surfaces where the latter contain said apertures, said photovoltaic cells being supported parallel with and adjacent to but spaced apart from said flat surfaces, thus leaving air passages between the photovoltaic cells and the collector panel whereby air can enter and leave said enclosed space by flowing through said air passages and along the undersides of the photovoltaic cells, thus removing excess heat build-up from the photovoltaic cells.

Further, this invention provides the combination of a building which defines a surface that generally faces in the direction of the sun during at least part of the daylight hours, with a generally corrugated solar collector panel secured to said surface in spaced relation thereto, to define therewith an enclosed space; a substantially flat surface defined by each of at least some of the panel corrugations, each substantially flat surface being configured and located such that it faces in the general direction of the sun during at least a portion of the daylight hours; at least part of the panel having a plurality of generally uniformly distributed apertures, said at least part of the panel including at least a portion of said flat surfaces of the corrugations; a plurality of substantially flat photovoltaic cells; and mounting means securing the photovoltaic cells to the corrugations at said flat surfaces where the latter contain said apertures, said photovoltaic cells being supported parallel with and adjacent to but spaced apart from said flat surfaces, thus leaving an air passage between each photovoltaic cell and the adjacent part of the collector panel whereby air can enter and leave said enclosed space by flowing through said air passage and along the underside of the photovoltaic cell, thus removing excess heat build-up from the photovoltaic cell.

GENERAL DESCRIPTION OF THE DRAWINGS

Three embodiments of this invention are illustrated in the accompanying drawings, in which like numerals denote like parts throughout the several views, and in which:

FIG. 3 is a perspective view of a second embodiment of a corrugated solar heat absorbing panel showing its combination with photovoltaic panels; and FIG. 4 is a sectional view taken perpendicular to the general direction of the corrugations, showing a further embodiment.

DETAILED DESCRIPTION OF THE DRAWINGS

Figure 1:
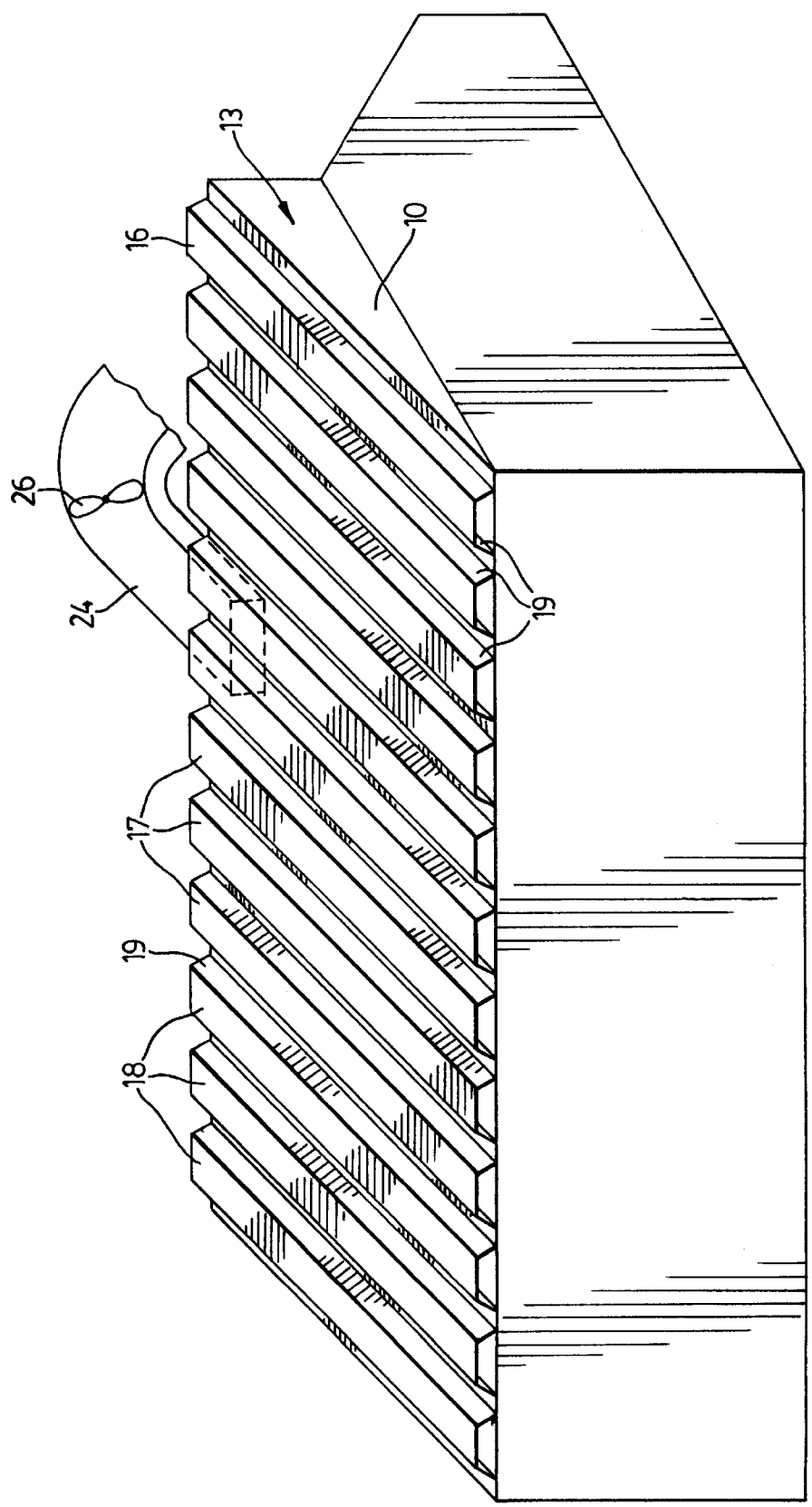
FIG. 1 is a perspective view of a first embodiment of a solar heat absorbing panel mounted on a roof.

FIG. 1 shows a partly broken-away perspective view of a system for carrying out the present invention. A building roof 10 is shown, this being typically of corrugated metal or tile construction, resting on transverse roof support members which are not illustrated. As with all building roofs and walls which are not insulated, a steady transfer of heat is experienced through the material when there is a temperature differential between the two sides. In the embodiment illustrated, a heat absorbing panel 16 is mounted to the roof 10 in spaced relation thereto, thus defining an enclosed, air-collecting space 13.

It will be noted that the heat absorbing panel 16 includes a plurality of trapezoidal corrugations 17, each having a flat outer wall 18 and two sloping side walls 19, along with flat gutter walls 19a.

Figure 2:
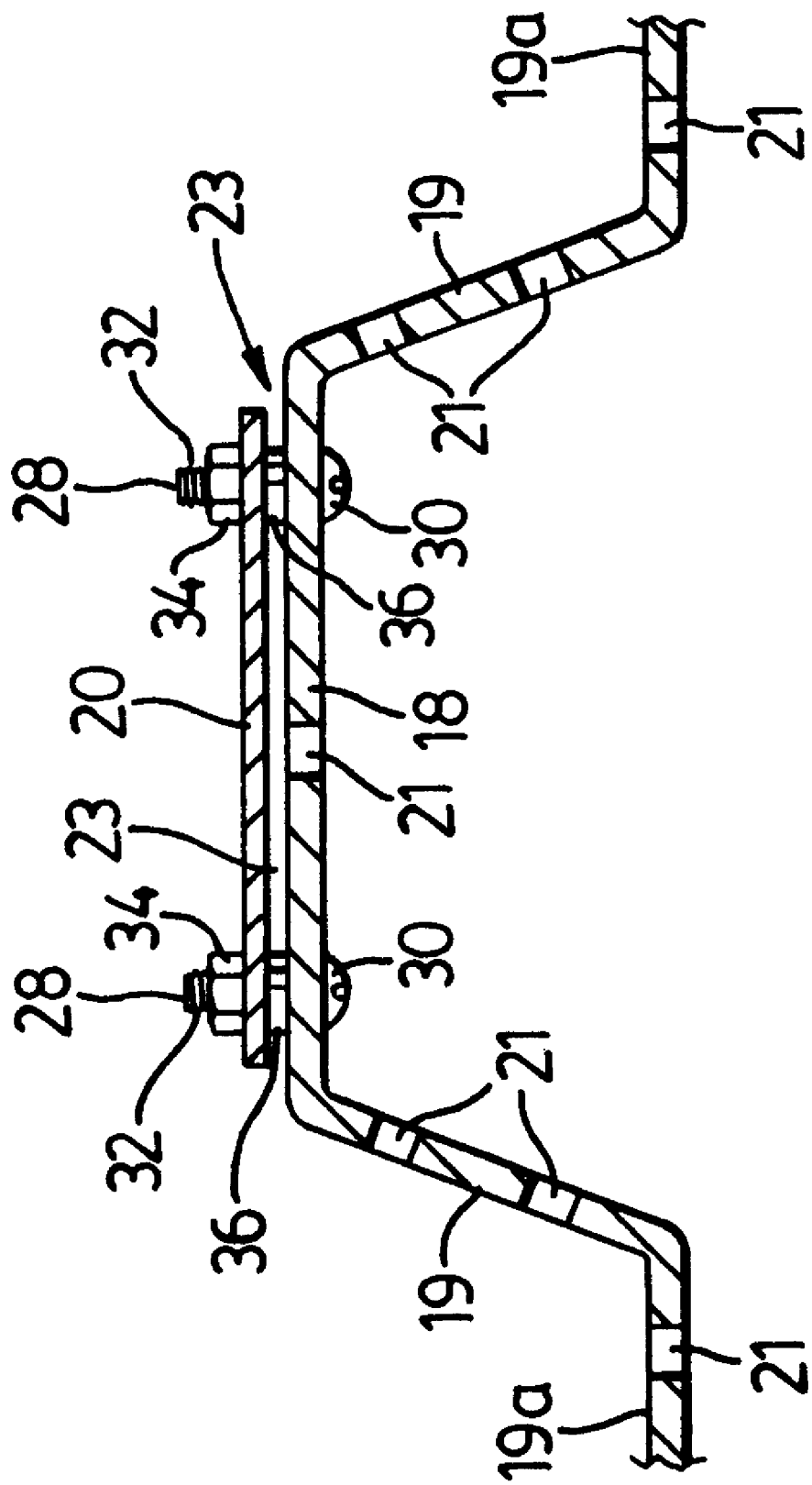
FIG. 2 is a sectional view through the structure of FIG. 1, taken on a plane which is perpendicular to the trapezoidal channels of the heat absorbing panel, and also perpendicular to the sloping other flat surface of the panel, showing a mounting possibility for the photovoltaic cells.

In the embodiment illustrated, the entire panel 16 has a plurality of generally uniformly distributed apertures 21 (seen only in FIG. 2).

The combination further includes a plurality of photovoltaic cells 20 which (in the embodiment illustrated) are secured by suitable mounting means to the flat outer wall 18 of each corrugation, positioned to be adjacent a portion of the wall 18 which contains the above-mentioned apertures 21. More specifically, the photovoltaic cells 20 are supported to lie parallel with and adjacent to the corresponding corrugation wall 18, but spaced apart from the wall 18 in such a way as to leave an air passage 23 between the photovoltaic cell 20 and the adjacent portion of the solar collector, such that air can enter and leave the enclosed space 13 (FIG. 1) by flowing through the air passage 23 and along the underside of the photovoltaic cell 20, thus removing excess heat build-up from the photovoltaic cell 20.

FIG. 2 shows only a single aperture 21 in the outer wall 18 adjacent the photovoltaic cell 20, it being understood that there is only a single aperture 21 in that region at the particular position of the cross-sectional plane. In actuality, there would be a number of generally distributed apertures 21 in the outer wall 18 of the corrugation, but a single cross-sectional view cannot intercept all such apertures.

Returning to FIG. 1, an air duct 24 is illustrated schematically, representing a passageway through which air can be extracted from the air-collecting space 13. If required, a fan 26 can be located in the duct 24.

Returning to FIG. 2, it can be seen that the photovoltaic cell 20 is supported in a position spaced away from the outside wall 18 by spacer bolts 28, each of which includes a head 30, a shank 32, a self-locking nut 34, and a washer-like spacer 36 lying between the photovoltaic cell 20 and the wall 18. Of course, the person skilled in the art could devise other mounting means capable of holding the photovoltaic cell in spaced relation to the wall 18.

The calculation of the number and spacing of the perforations 21 is based on the volume of air required during the heating season. If heating is not required, then the calculation of the number and spacing of the holes is based on the thermodynamic principles which allow hot air to rise.

Attention is now directed to FIG. 4, which illustrates a sectional view taken perpendicularly with respect to the general elongation of the corrugations 40. The corrugations 40 consist of flat surfaces 42 which alternate with recessed portions 44, the flat surfaces 40 and recesses 44 defining a plurality of side-by-side trapezoidal configurations. It will be noted in particular that the flat surfaces 40 are all in planar alignment (coplanar).

As with the embodiments described earlier, the solar collector panel consisting of the surfaces 42 and the recesses 44 has a plurality of generally uniformly distributed apertures (not seen in FIG. 4), covering at least part of the panel.

As further seen in FIG. 4, PV cells 46 are sized to cover the recesses 44, and thus are relatively long and narrow panels. Spacers 48 are provided to mount the PV cells 46 in spaced position above the recesses 44.

As shown at the right of FIG. 4, PV cells 46a may be made wider than the recesses 44, such that marginal portions 50 of the cells 46 project toward each other in spaced alignment above the surfaces 42, in such a way as to leave a small gap 52 between them. It is contemplated that the embodiment seen in FIG. 4 will be suitable where it is desired to efficiently provide electrical wiring to connect the PV cells. Such wiring can lie within an "electrical conduit" defined by the recesses 44 and covered by the PV cells 46.

In FIG. 3, several PV cells 54 are combined into a single PV panel 56 sized to span several adjacent flat surfaces 42 and several recesses 44. Again, the corrugated panel 58 is perforated and the PV panels 56 are spaced above the surfaces 42 to allow cooling air to pass below the panels 56 and through the apertures.

While several embodiments of this invention have been illustrated in the accompanying drawings and described hereinabove, those skilled in the art will appreciate that changes and modifications may be made therein without departing from the essence of this invention, as set forth in the appended claims.

The embodiments of the invention in which an exclusive property or privilege is claimed are defined as follows:

1. In combination:
    a generally corrugated solar collector panel adapted to be secured to a building surface in spaced relation thereto, to define therewith an enclosed space,
    a substantially flat surface defined by each of at least some of the panel corrugations, each substantially flat surface being configured and located such that it faces in the general direction of the sun during at least a portion of the daylight hours,
    at least part of the panel having a plurality of generally uniformly distributed apertures, said at least part of the panel including at least a portion of said flat surfaces of the corrugations,
    a plurality of substantially flat photovoltaic cells,
    and mounting means securing the photovoltaic cells to the corrugations at said flat surfaces where the latter contain said apertures, said photovoltaic cells being supported parallel with and adjacent to but spaced apart from said flat surfaces, thus leaving air passages between the photovoltaic cells and the collector panel whereby air can enter and leave said enclosed space by flowing through said air passages and along the undersides of the photovoltaic cells, thus removing excess heat build-up from the photovoltaic cells.

2. The combination claimed in claim 1, in which the corrugations of the collector panel are substantially trapezoidal when seen in section.

3. The combination claimed in claim 1, in which the apertures are distributed over substantially the entire surface of the solar collector panel.

4. The combination claimed in claim 2, in which the apertures are distributed over substantially the entire surface of the solar collector panel.

5. The combination of a building which defines a surface that generally faces in the direction of the sun during at least part of the daylight hours, with a generally corrugated solar collector panel secured to said surface in spaced relation thereto, to define therewith an enclosed space; a substantially flat surface defined by each of at least some of the panel corrugations, each substantially flat surface being configured and located such that it faces in the general direction of the sun during at least a portion of the daylight hours; at least part of the panel having a plurality of generally uniformly distributed apertures, said at least part of the panel including at least a portion of said flat surfaces of the corrugations; a plurality of substantially flat photovoltaic cells; and mounting means securing the photovoltaic cells to the corrugations at said flat surfaces where the latter contain said apertures, said photovoltaic cells being supported parallel with and adjacent to but spaced apart from said flat surfaces, thus leaving an air passage between each photovoltaic cell and the adjacent part of the collector panel whereby air can enter and leave said enclosed space by flowing through said air passage and along the underside of the photovoltaic cell, thus removing excess heat build-up from the photovoltaic cell.

6. The combination claimed in claim 5, in which the corrugations of the collector panel are substantially trapezoidal when seen in section.

7. The combination claimed in claim 5, in which the said apertures are distributed over substantially the entire surface of the solar collector panel.

8. The combination claimed in claim 6, in which the said apertures are distributed over substantially the entire surface of the solar collector panel.

9. The combination claimed in claim 5, further including air-moving means operatively associated with said enclosed space, by which air can be positively urged to move through said apertures.

10. The combination claimed in claim 8, further including air-moving means operatively associated with said enclosed space, by which air can be positively urged to move through said apertures.

11. The combination claimed in claim 1, in which said flat surfaces defined by panel corrugations are substantially in planar alignment and alternate with recessed portions of the corrugations, said photovoltaic cells being incorporated into photovoltaic panels which overlie at least part of said flat surfaces and which span at least part of said recessed portions.

12. The combination claimed in claim 5, in which said flat surfaces defined by panel corrugations are substantially in planar alignment and alternate with recessed portions of the corrugations, said photovoltaic cells being incorporated into photovoltaic panels which overlie at least part of said flat surfaces and which span at least part of said recessed portions.

* * * * *